(12) United States Patent
Liu et al.

(10) Patent No.: US 6,288,916 B1
(45) Date of Patent: Sep. 11, 2001

(54) MULTIPLE OUTPUT UNINTERRUPTIBLE ALTERNATING CURRENT POWER SUPPLIES FOR COMMUNICATIONS SYSTEM

(75) Inventors: Frank Liu; Pu Han; Lam Vu, all of Bellingham, WA (US)

(73) Assignee: Alpha Technologies, Inc., Bellingham, WA (US)

( * ) Notice: Subject to any disclaimer, the term of this patent is extended or adjusted under 35 U.S.C. 154(b) by 0 days.

(21) Appl. No.: 09/419,220

(22) Filed: Oct. 15, 1999

(51) Int. Cl.[7] ............................. H02M 5/45; H02J 7/00
(52) U.S. Cl. ........................... 363/37; 363/71; 307/66; 307/82
(58) Field of Search ........................... 363/34, 37, 71; 307/64, 66, 82

(56) References Cited

U.S. PATENT DOCUMENTS

| | | |
|---|---|---|
| 4,860,185 * | 8/1989 | Brewer et al. ........................ 363/41 |
| 5,200,643 | 4/1993 | Brown . |
| 5,579,197 | 11/1996 | Mengelt et al. . |
| 5,745,356 | 4/1998 | Tassitino, Jr. . |
| 5,768,117 | 6/1998 | Takahashi et al. . |
| 5,844,327 | 12/1998 | Batson . |
| 5,901,057 | 5/1999 | Brand et al. . |
| 5,982,645 * | 11/1999 | Levran et al. ........................ 363/37 |
| 5,982,652 | 11/1999 | Simonelli et al. . |
| 5,994,794 * | 11/1999 | Wehrlen ............................... 307/66 |

* cited by examiner

Primary Examiner—Adolf Deneke Berhane
(74) Attorney, Agent, or Firm—Michael R. Schacht; Hughes & Schacht, P.S.

(57) ABSTRACT

A UPS system for communications systems. The UPS system comprises an input stage that generates primary and standby AC power signals. The primary and standby AC power signals are passed through an isolation transformer and through an output rectifier to obtain an output DC power signal. A plurality of output inverters are used to generate a plurality of output AC power signals from the output DC power signal. A switch circuit is provided to connect one or more of the output DC power signals to one or more loads of the communications system.

15 Claims, 8 Drawing Sheets

MULTIPLE OUTPUT UNINTERRUPTIBLE ALTERNATING CURRENT POWER SUPPLIES FOR COMMUNICATIONS SYSTEM

TECHNICAL FIELD

The present invention relates to power supplies for communications systems and, more specifically, to uninterruptible power supply (UPS) systems adapted to generate an AC power signal from a utility power source or a battery and supply the AC power signal through a plurality of output terminals to a coaxial cable-based communications system or a hybrid fiber/coax communications system.

BACKGROUND OF THE INVENTION

Communications systems for distributing television, telephony, and data signals often comprise coaxial cables over which television and/or communications signals (hereinafter collectively data signals) are carried. Coaxial cables conventionally carry, in addition to data signals, a low frequency AC power signal from for powering line extending amplifiers that amplify the data signals to avoid signal degradation as the data signals propagate through the network and/or for powering the network interface unit located at the customer premises. A communications system comprised of coaxial cables will be referred to as a coaxial network.

Many modern communications systems comprise both coaxial cables and fiber optic cables. The fiber optic cables distribute the data signal from the cable headend to various points throughout the network, at which point the data signals are converted to a format appropriate for transmission over existing coaxial cables. The equipment involved in converting the data signals from fiber optic format to coaxial format will be referred to herein as fiber optic cable support equipment. Both the coaxial cables and the fiber optic cable support equipment require an appropriate AC power signal for operation. A communications system comprised of both fiber optic and coaxial cables will be referred to herein as a hybrid fiber-coax (HFC) network.

The AC power signals used by coaxial and HFC networks are conventionally provided by power supplies distributed throughout the communications system. These conventional power supplies generate their power from a utility power source, but contain batteries to provide standby service in the event of a utility power disruption. Such power supplies will be referred to herein as uninterruptible power supplies, or UPS's.

The reliability of a coaxial or HFC network depends in large part on the reliability of the AC power signal used by the various components of the network; as such networks are modified for the transmission of communications signals in addition to television signals, the tolerance for network failures decreases. The reliability of the UPS's used in such networks is thus an important consideration.

The efficiency with which the UPS's generate the AC power signals is also significant because the utility power signals are all passed through the UPS's to obtain the AC power signals used by the network. UPS's must also meet a satisfy a number of performance criteria to ensure proper operation of the network components and thus reliable distribution of the data signals carried by the network.

In addition, a large number of UPS's are distributed throughout a typical coaxial or HFC network. The cost of purchasing and maintaining these UPS's is thus a significant portion of the costs of operating the network.

The need thus exists for UPS's for coaxial and HFC networks having improved reliability and efficiency and acceptable performance but which maintain network operating costs at a desirable level.

SUMMARY OF THE INVENTION

The present invention may be implemented as an uninterruptible power supply system comprising: an input stage that generates high frequency primary and standby AC power signals; an isolation transformer operatively connected to receive the primary and standby AC power signals; an output rectifier operatively connected to the isolation transformer for generating an output DC power signal based on the primary and standby AC power signals; and a plurality of output inverters, where each of the output inverters generates an AC power signal based on the output DC power signal.

A UPS system implementing the present invention may further comprise a switch array arranged between the output inverters and one or more loads of the communications system and switch control software for controlling the switches to connect one or more of the output AC power signals to one or more loads of the communications system.

Preferably, but not necessarily, the input stage comprises: an input rectifier for generating a power factor corrected input DC power signal from a utility power signal; an input inverter that generates the primary AC power signal from the input DC power signal; and a battery inverter that generates the standby AC power signal from a battery. The input stage may further comprise a battery charger for charging the battery based on the input DC power signal.

A UPS constructed according to the present invention is designed with redundancy to increase system reliability. However, a UPS of the present invention is redundant only in certain components, which maintains network operating costs at a desirable level. The present system is also designed to operate efficiently and within acceptable performance parameters.

DETAILED DESCRIPTION OF THE PREFERRED EMBODIMENTS

The basic concept of the present invention may be embodied in any one of a number of configurations. An exemplary embodiment of the present invention will be described below, with the understanding that this embodiment illustrates the scope of the present invention but is not intended to be an exhaustive description of all scenarios in which the present invention may be used. In addition, not all components of the exemplary embodiment described below are needed to implement the present invention in a more basic form.

Figure 1:
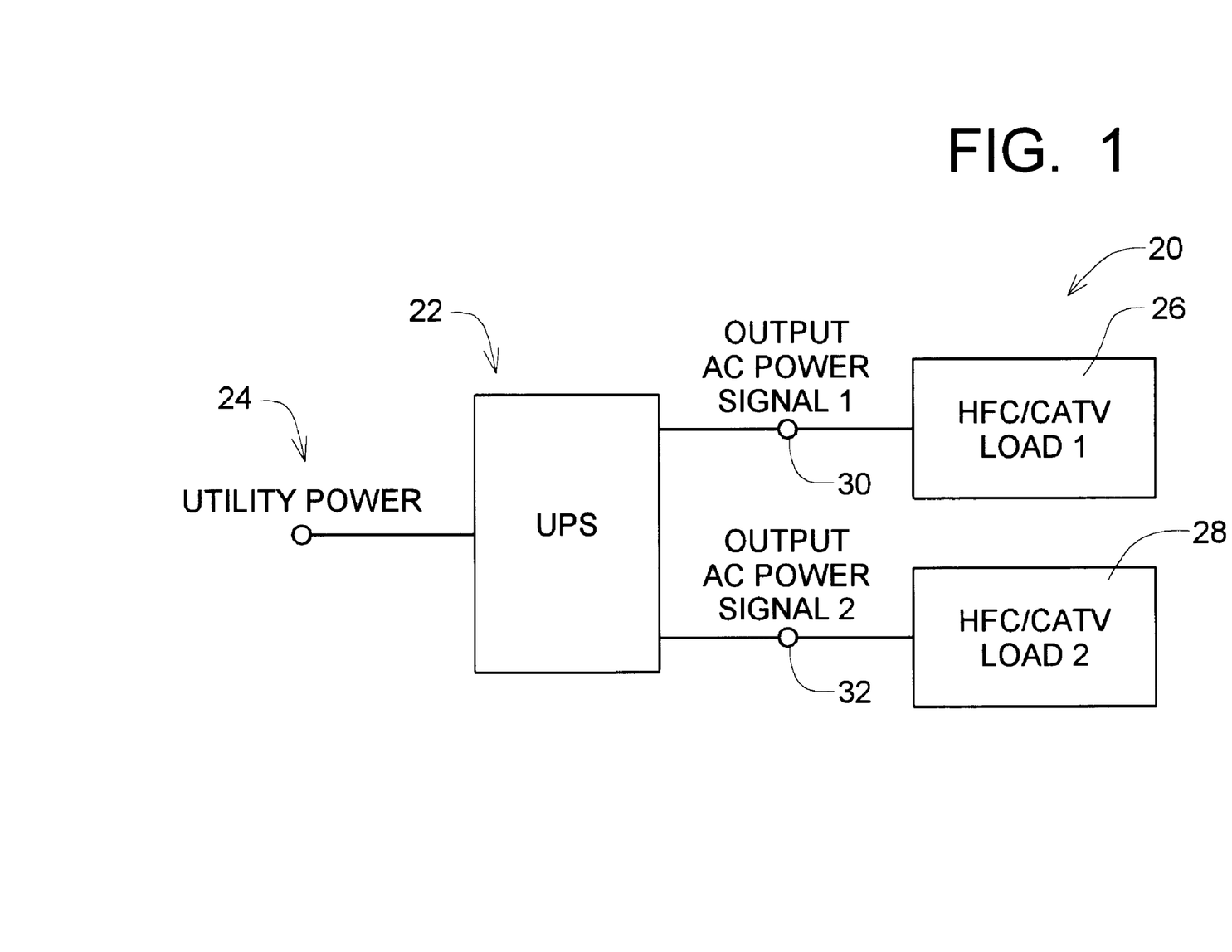
FIG. 1 is a highly schematic block diagram depicting an exemplary environment in which a UPS system constructed in accordance with the present invention may be used.

Referring now to FIG. 1, depicted therein at 20 is a highly schematic block diagram of a communications system employing a UPS system 22 constructed in accordance with, and embodying, the principles of the present invention. The communications system 20 operates on a utility power source 24 and contains a plurality of loads 26 and 28 that operate off of AC power. The exemplary system 20 may either be a conventional coaxial cable-based system such as a cable television system or may be a hybrid fiber coax system. In either case, certain components of the system require an AC power signal for proper operation.

The UPS system 22 is connected to the utility power as shown by block 24 and generates a plurality of output AC power signals 30 and 32. The first AC power output signal shown at 30 is connected to the HFC/CATV load shown at 26, while the second AC power output signal shown at 32 is connected to the second HFC/CATV load shown at 28. As will be described below, the UPS system 22 generates these output AC power signals 30 and 32 even if the utility power 24 is disrupted.

Figure 2:
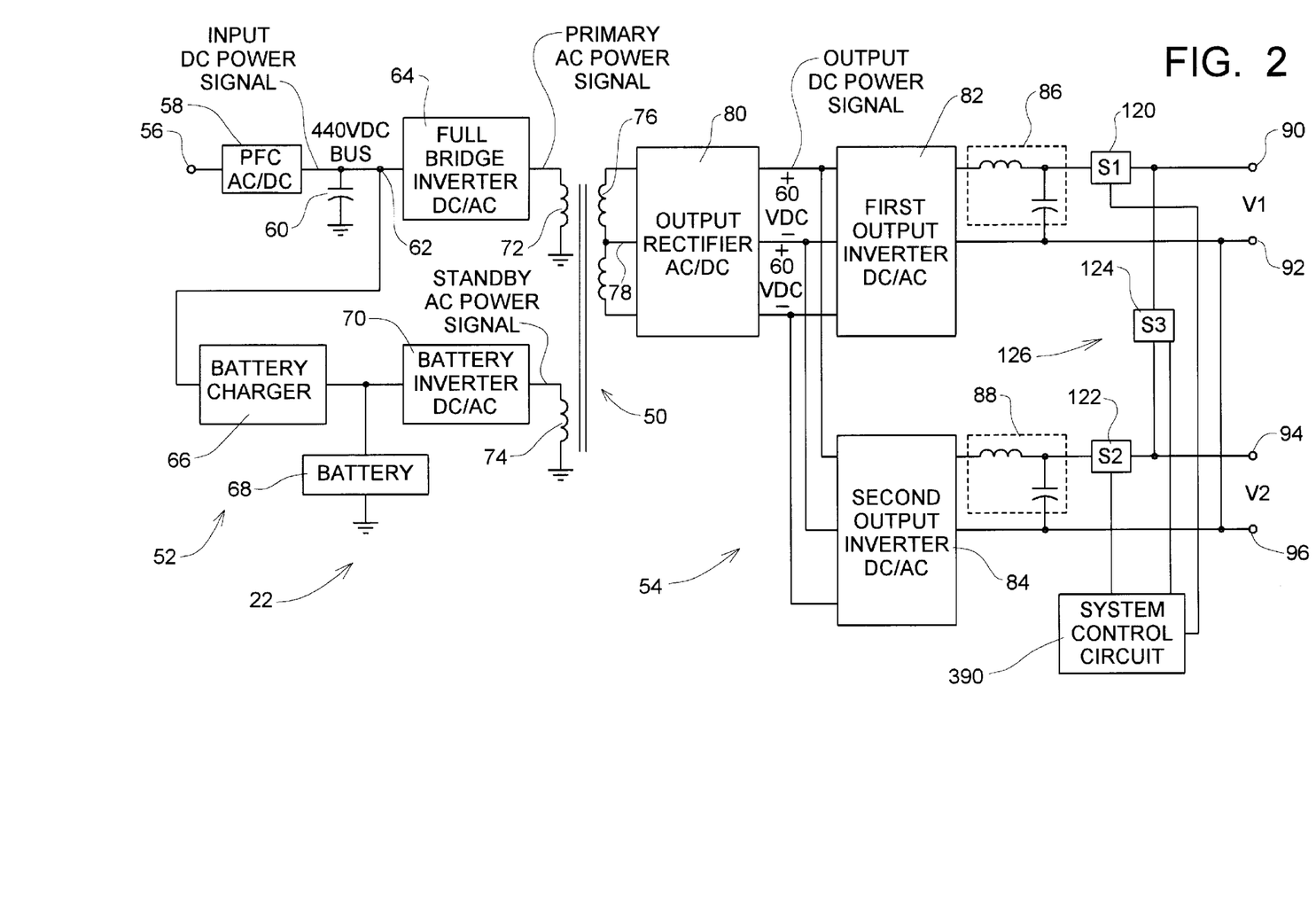
FIG. 2 is a block diagram depicting the details of the exemplary UPS system shown in FIG. 1.

Referring now to FIG. 2, depicted therein is a block diagram of the UPS system 22 described above. This system 22 comprises an isolation transformer 50. The UPS system 20 comprises an input stage 52 on one side of the transformer 50 and an output stage 54 on the other side of the transformer 50.

The input stage 52 is generally conventional and will not be described herein in detail beyond what is necessary for a complete understanding of the present invention. In particular, the utility power is received at a terminal 56 and converted from AC to DC by a power factor corrected inverter circuit 58 and capacitor 60. An input DC power signal is thus formed on an input DC bus 62. In the exemplary UPS system 22, 440 volts DC are generated at the bus 62.

Connected to the bus 62 is a full bridge inverter 64 that converts the input DC power signal into a primary AC power signal. Also connected to the input DC bus 62 is a battery charger 66 that charges a battery 68 using the input DC power signal. Connected to the battery 68 is a battery inverter 70 that converts energy stored in the battery 68 into a standby AC power signal.

The transformer 50 comprises a first input winding 72, a second input winding 74, and an output winding 76. The primary AC power signal generated by the full bridge inverter 64 is applied to the first input winding 72, while the standby AC power signal generated by the battery inverter 70 is applied across the second input winding 74.

The output winding 76 has a center tap 78. Connected across the output winding 76 is an output rectifier 80. The output rectifier 80 is generally conventional and generates an output DC power signal. In particular, the output DC power signal is formed by positive and negative DC signals centered about the center tap 78 of the output winding 76. In the exemplary rectifier 80, the DC signals are 60 volt DC signals, but other DC signals may be used in different environments.

The output DC power signal is applied to a plurality of output inverters such as the inverters 82 and 84 shown in FIG. 2. The output inverters 82 and 84, along with filtering circuits 86 and 88, generate first and second utility-frequency AC power output signals V1 and V2 across terminals 90, 92, and 94, 96, respectively.

The UPS system 22 further comprises first, second, and third switches 120, 122, and 124; these switches 120–124 form a switch array 126 that allows the system 22 to determine which of the inverters 82 and 84 generates the voltage across the terminals 90, 92, and 94, 96. The first and second switches 120 and 122 are connected between the output inverters 82 and 84 and their associated loads 26 and 28, respectively. The third switch 124 is a secondary switch that is connected between the primary switches 120 and 122 on the load side thereof.

The UPS system 22 may be used in different configurations. In a first configuration, the terminals 90, 92 are connected to the first load 26 described above and the terminals 94 and 96 are connected to the second load 28 described above. Under normal circumstances, the output AC power signal that powers the first load 26 is generated by the first output inverter 82 and the second AC power signal that powers the second load 28 is generated by the second output inverter 84. In this configuration, the first and second (primary) switches 120 and 122 are closed, and the third (secondary) switch 124 is opened.

However, should either of the output inverters 82 and 84 fail, the switches 120, 122, and 124 may be operated effectively to remove the failed inverter from the system 22. For example, should the first output inverter 82 fail, the first primary switch 120 will be opened and the third (secondary) switch 124 will be closed. At this point, the second output inverter 84 generates both the first AC output voltage V1 and the second AC output voltage V2.

In another configuration, the UPS system 22 may be operated with a load connected only across one of the two output terminal pairs 90,92 and 94,96. In this configuration, the switches 120–124 are arranged such that one of the inverters 82 and 84 is in use at a time and, should that inverter fail, the switches 120–124 are reconfigured such that the other of the inverters 82 and 84 supplies the AC power output signal.

Figure 3:
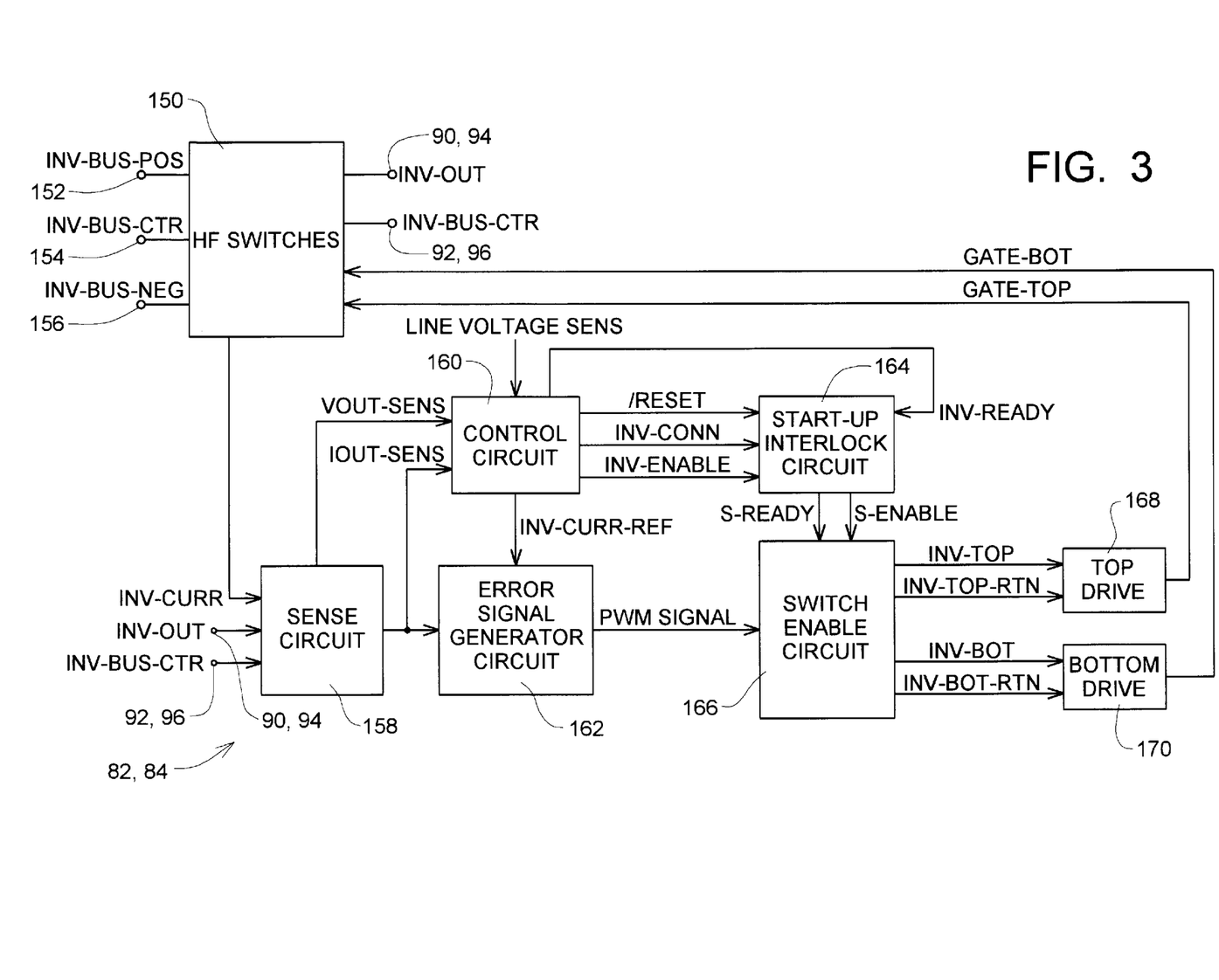
FIG. 3 is a block diagram of the output inverter circuits used by the UPS system of FIG. 2.

Shown in FIG. 3 is a block diagram depicting the operational details of the output inverters 82 and 84. In the exemplary UPS system 22, these inverters 82 and 84 are identical; the components shown in FIG. 3 are duplicated for each of the inverters 82 and 84.

Referring now in detail to FIG. 3, depicted at 150 therein is a block labeled HF Switches comprising first, second, and third input terminals 152, 154, and 156, and first and second output terminals 90, 94 and 92, 96 described above. As will be described in further detail below, the HF Switches block 150 comprises high frequency inverter switches, which are opened and closed by pulse width modulated signals, and the filtering circuit 86, 88 generally described above.

The input terminals 152, 154 and 156 and output terminals 90, 94 and 92, 96 depict the flow of power through the circuit of FIG. 3. Additional lines shown in FIG. 3 depict control and monitoring lines.

In particular, a sense circuit 158 generates VOUT-SENS and IOUT-SENS signals based on an INV-CURR signal and the INV-OUT and INV-BUS-CTR signals present at the terminals 90, 94 and 92, 96.

The VOUT-SENS and IOUT-SENS signals, as well as a LINE-VOLTAGE-SENS signal, are applied to a control circuit 160, and the IOUT-SENS signal is also applied to an error signal generator circuit 162. The control circuit 160 generates an INV-CURR-REF signal that is input to the error signal generator circuit 162. The INV-CURR-REF signal is generated based on the IOUT-SENS signal and the LINE-VOLTAGE-SENSE signals. The use of the LINE-VOLTAGE-SENS signal ensures that the output AC power signal generated by the circuits 82 and 84 is in phase with the utility power signal.

The control circuit 160 also generates /RESET, INV-CONN, INV-ENABLE, and INV-READY signals that are input to a start-up interlock circuit 164.

The error signal generator circuit 162 generates a pulse width modulated (PWM) signal for controlling the high frequency switches and passes this to a switch enable circuit 166. Based on the RESET, INV-CONN, INV-ENABLE, and INV-READY signals, the start-up interlock circuit generates S-READY and S-ENABLE signals that are applied to the switch enable circuit 166 to allow or prevent passage of the PWM signal.

If the PWM signal is passed through the switch enable circuit 166, INV-TOP and INV-BOT signals are applied to top and bottom drive circuits 168 and 170, respectively. INV-TOP-RTN and INV-BOT-RTN paths are also provided for each of the drives 168 and 170.

The drives 168 and 170 generate GATE-BOT and GATE-TOP signals that connect to the high frequency switches block 150 to control the inverter switches as will be described in further detail below. Again, GATE-TOP-RTN and GATE-BOT-RTN signal paths are provided for each of the GATE-TOP and GATE-BOT signals described above.

With the foregoing basic understanding of the output inverter circuits 82 and 84 in mind, the details of these circuits will now be described in further detail.

Figure 4A:
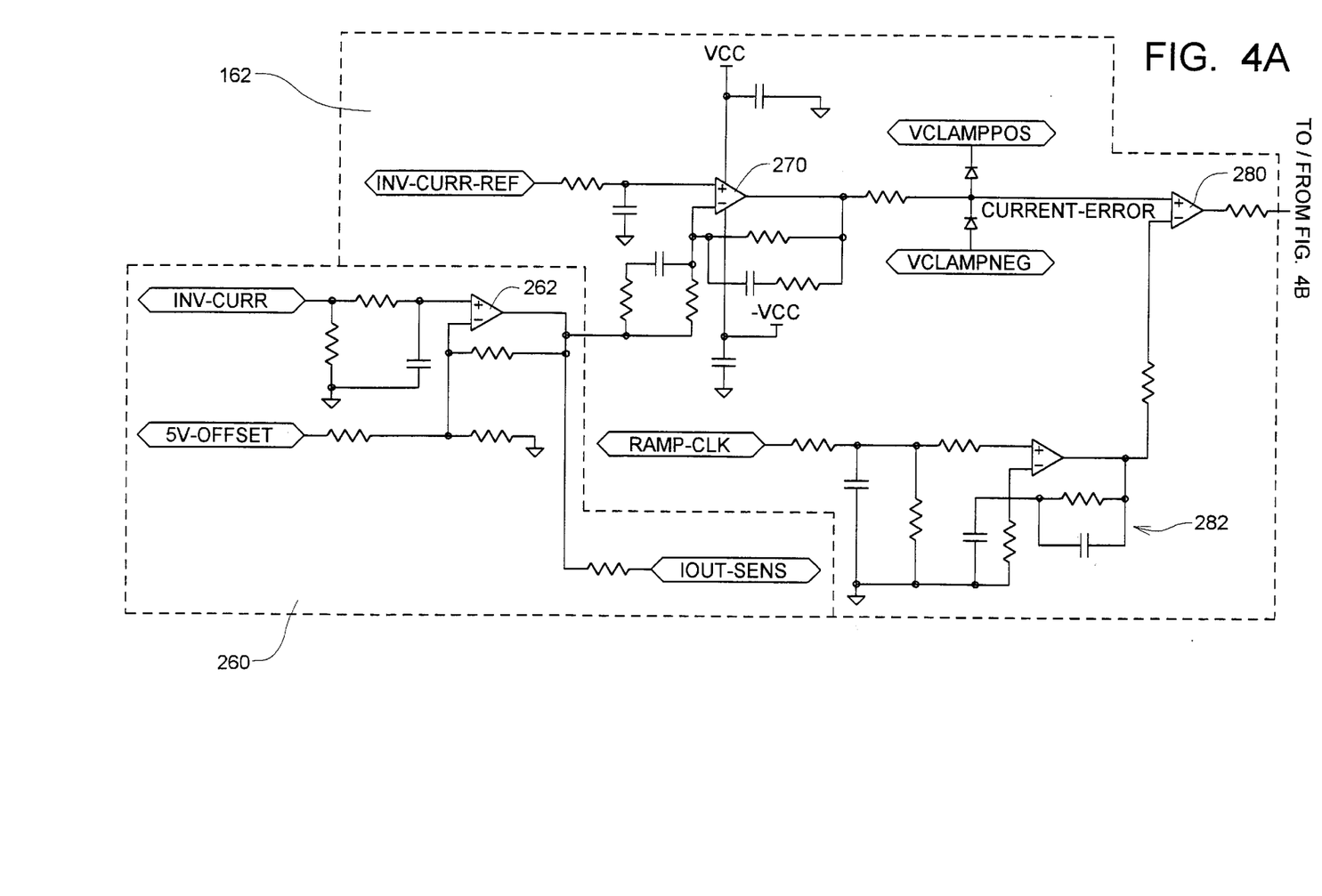
FIGS. 4A–G are circuit diagrams depicting details of the block diagram of FIG. 3.
Figure 4B:
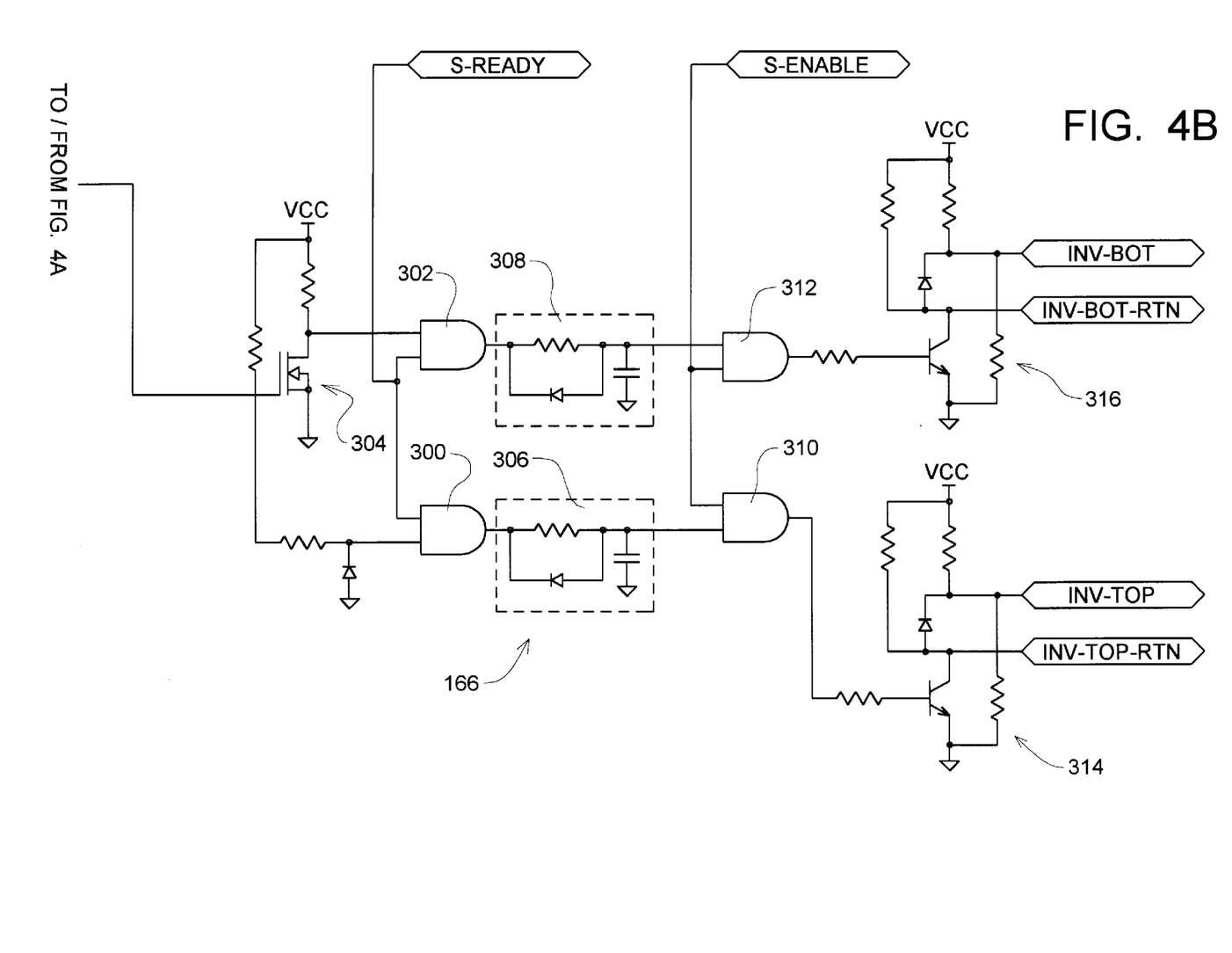
Figure 4C:
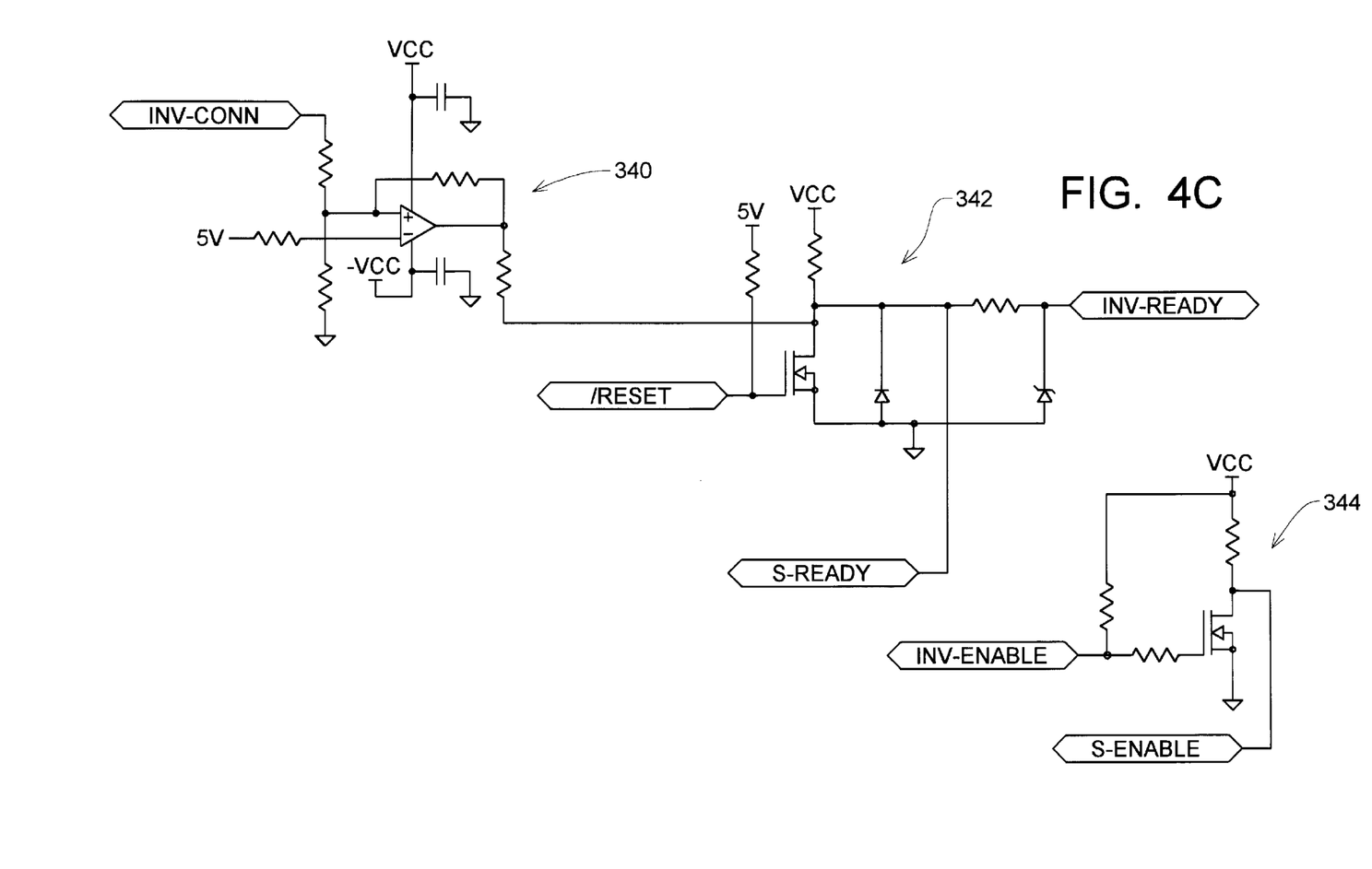
Figure 4D:
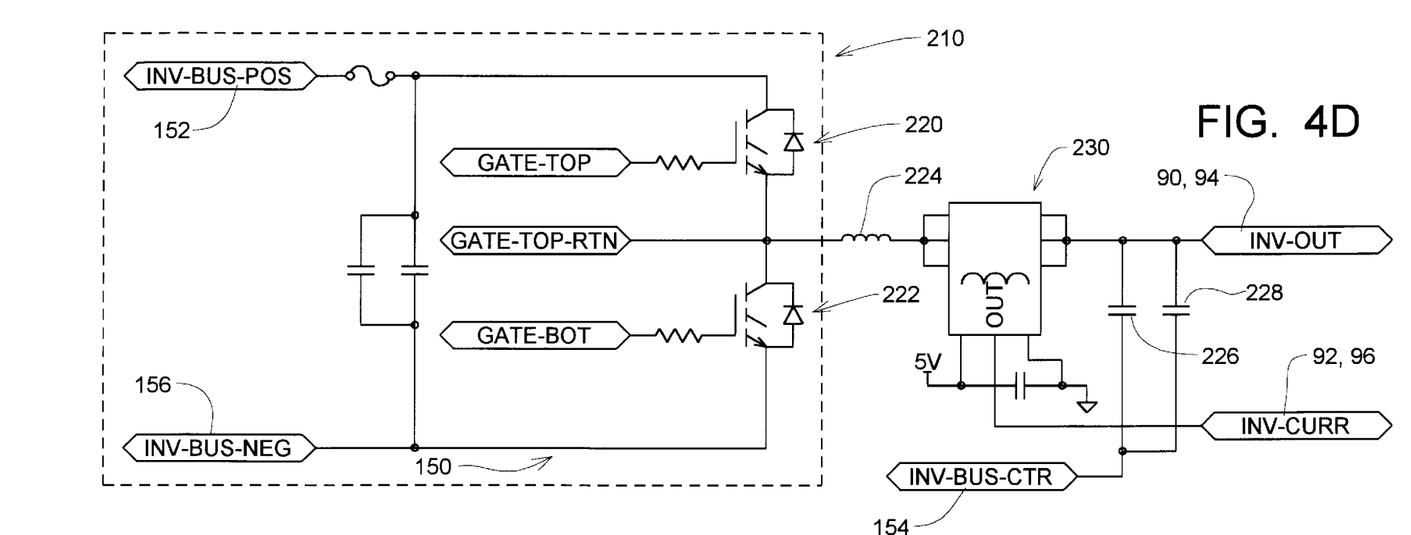

Referring initially to FIG. 4D, depicted at 210 therein is a high frequency inverter circuit comprising first and second switch circuits 220 and 222. Also shown in FIG. 4D is an output inductor 224 and output capacitors 226 and 228 that form the filter circuit 86, 88 generally discussed above. A current sense circuit 230 that generates the INV-CURR signal described above is connected in series with the inductor 224.

The first inverter switch circuit 220 is connected between the first input terminal 152 and the inductor 224. The second inductor switch circuit 222 is connected between the third input terminal 156 and the inductor 224. Signals discussed above in reference to FIG. 3 are also shown in FIG. 4D.

FIG. 4D thus illustrates a circuit that generates an AC power output signal based on PWM signals applied to the inverter switch circuits 220 and 222.

Figure 4E:
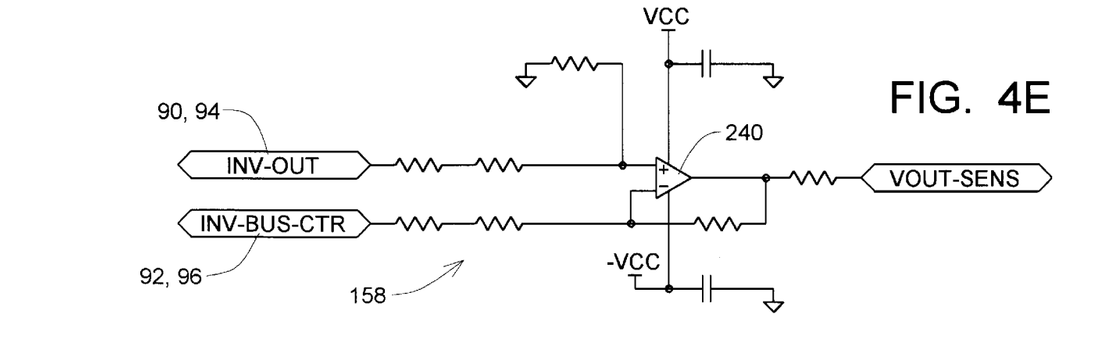

Referring now to FIG. 4E, depicted therein is a portion of the sense circuit 158 described above. FIG. 4E depicts an amplifier 240 that is connected across the first and second output terminals 90, 94 and 92, 96 to generate the VOUT-SENS signal representing the voltage across the output terminals described above.

Referring now back to FIG. 4A, depicted therein at 260 is yet another portion of the sense circuit 158. This circuit 260 comprises an INV-CURR signal and a five volt offset such that the IOUT-SENS signal generally corresponds to the actual output current.

FIG. 4A further depicts the error signal generator circuit 162 described above. Based on the VOUT-SENSE and IOUT-SENS signals, the control circuit 160 generates an INV-CURR-REF signal that is input to an amplifier 270 configured as a differential amplifier. The differential amplifier 270 generates a CURRENT ERROR signal based on a difference between the INV-CURR-REF signal, which represents the desired output current, and the IOUT-SENS signal, which represents the actual output current. The CURRENT ERROR signal thus represents the difference between the desired current and actual current.

The output of the amplifier 270 is connected to first and second limiting diodes 270 and 272 which are in turn connected to signals VCLAMPPOS and VCLAMPNEG. The VCLAMPPOS and VCLAMPNEG signals are preset voltage levels that ensure that the CURRENT ERROR signal is within a predetermined range selected to limit the voltage output of the inverters 82, 84 to within acceptable parameters.

The CURRENT ERROR signal is next input to an amplifier 280 configured to compare the CURRENT ERROR signal with the ramp signal generated by a ramp signal generating circuit 282. The output of the amplifier 280 is the PWM signal described above. The PWM signal corresponds to the CURRENT ERROR signal such that the widths of the pulses of the PWM signal are varied to eliminate any difference between the desired current and the actual current.

Referring now to FIG. 4B, depicted therein is the switch enable circuit 166 described above. The inputs to this switch enable circuit are the PWM signal, the S-READY signal, and the S-ENABLE signal generally described above.

The PWM signal is applied directly to a first AND gate 300 and to a second AND gate 302 through an inverting circuit 304. The result is that one input to the AND gate 300 is the PWM signal itself and one input to the second AND gate 302 is the complement of the pulse width modulated signal (PWM-NOT). The other input to the AND gates 300 and 302 is the S-READY signal. Thus, the PWM signal and the PWM-NOT signal are not passed through the AND gates 300 and 302 unless the S-READY signal is high.

The PWM signal and PWM-NOT signal are then applied to delay circuits 306 and 208 that ensure that the PWM and PWM-NOT signals are never "on" or "high" at the same time. This is important to ensure that the inverter switches are not opened simultaneously, creating a short between the first and third input terminals 152 and 156.

The PWM signal and PWM-NOT signal are then applied to AND gates 310 and 312. The other input to these AND gates 310 and 312 is the S-ENABLE signal described above. The S-ENABLE signal is generated based on the INV-ENABLE signal described above. Again, if the INV-ENABLE signal is not in its appropriate state, the PWM and PWM-NOT signals are not passed through the end gate 310 and 312.

Referring form a moment to FIG. 4C, it can be seen that the S-READY and S-ENABLE signals are generated by buffer circuits 340 and 342 and inverter circuit 344 based on the INV-CONN, /RESET, and INV-ENABLE signals described above. The INV-CONN signal is generated when the inverter is properly seated in its mechanical connector. The INV-READY signal is generated by the control circuit when the system is ready. The /RESET signal allows the control circuit 160 to reset the inverters. The start-up interlock circuit 164 thus generates the S-READY and S-ENABLE signals based on hardware and logic factors that indicate that the conditions for operation of the inverter are not satisfied. When all of the conditions for proper operation of the inverter are satisfied, the INV-READY signal is sent back to the control circuit 160.

The PWM and PWM-NOT signals are then passed through predriver circuits 314 and 316. These predriver circuits generate the INV-TOP, INV-BOT, INV-TOP return, and INV-BOT return signals described above in reference to FIG. 3.

Figure 4F:
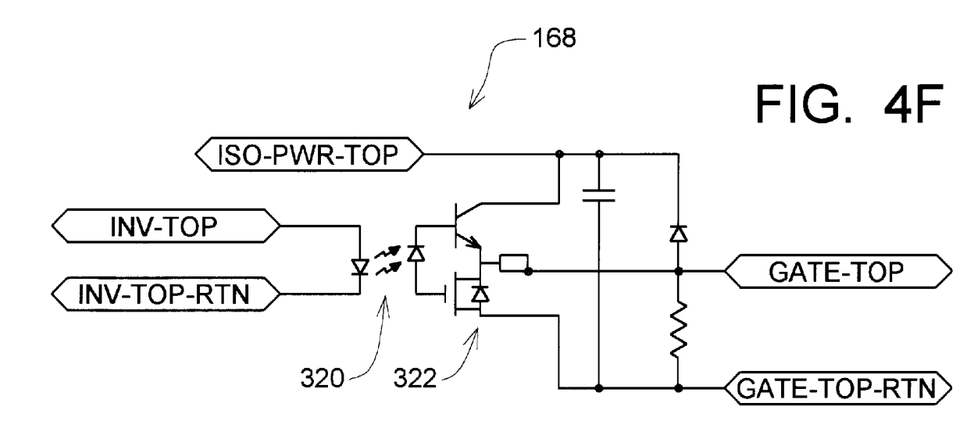
Figure 4G:
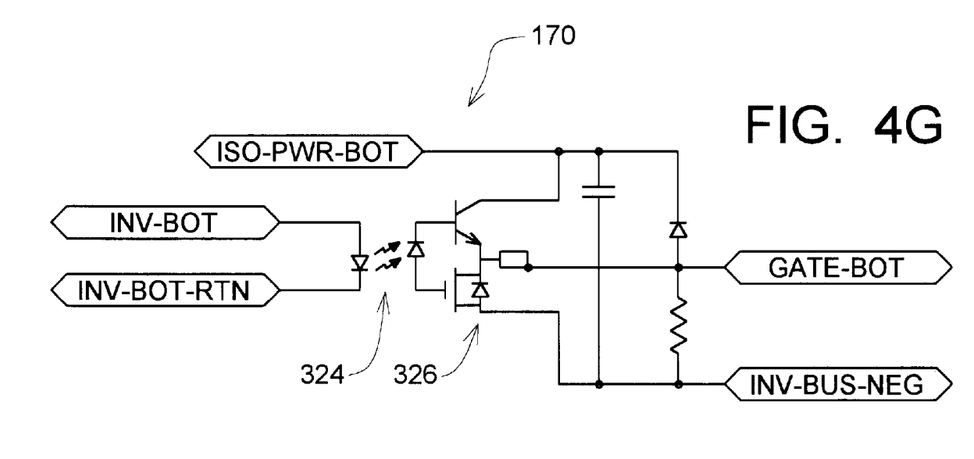

Referring now to FIGS. 4F and 4G, depicted therein are the top and bottom drive circuits 168 and 170, respectively. The INV-TOP and INV-TOP return signals are applied through an opto-isolator 320 to a driver circuit 322 that generates the GATE-TOP signal appropriate for driving the first inverter switch 220 described above. Similarly, the INV-BOT and INV-BOT-RTN signals are applied through an opto-isolator 324 and a drive circuit 326 to generate the GATE-BOT appropriate for driving the second inverter switch 222.

The control circuit 160 described above may be implemented in the form of a microprocessor with integrated RAM and ROM containing the logic necessary to perform the functions described above. Of course, the functions of the control circuit 160 may be implemented with discrete circuitry if appropriate.

In addition to the local control circuit 160 of each of the output inverters 82 and 84, a system control circuit 390 is provided for controlling the UPS system 22. The functions of the local control circuit may be performed by the system control circuit 390, obviating the need for local control circuits for each of the output inverters 82 and 84.

In addition, the system control circuit 390 will be responsible for operating the first, second, and third switches 120–126 as described above. The system control circuit 390 will also handle system control, interface, and timing functions relating to the input stage 52 as is well-known in the art.

From the foregoing, it should be clear that the present invention may be embodied in forms other than that described above.

What is claimed is:

1. A UPS system for communications system comprising:
  an input stage primary and standby AC power signals;
  an isolation transformer operatively connected to receive the primary and standby AC power signals;
  an output rectifier operatively connected to the isolation transformer for generating an output DC power signal based on the primary and standby AC power signals;
  a plurality of output inverters, where each of the output inverters generates an AC power signal based on the output DC power signal;
  a switch array arranged between the output inverters and one or more loads of the communications system, the switch array comprising a primary switch arranged between each of the output inverters and the load associated therewith, and at least one secondary switch arranged between two of the loads associated with the output inverters; and
  switch control means for controlling the primary and secondary switches to connect one or more of the output AC power signals to one or more loads of the communication system.

2. A UPS system as recited in claim 1, in which the input stage comprises:
  an input rectifier for generating an input DC power signal from a utility power signal;
  an input inverter that generates the primary AC power signal from the input DC power signal; and
  a battery inverter that generates the standby AC power signal from a battery.

3. A UPS system as recited in claim 2, further comprising a battery charger for charging the battery based on the input DC power signal.

4. A UPS system for a communications system comprising a plurality of loads, the UPS system comprising:
  an input stage that generates primary and standby AC power signals;
  an isolation transformer operatively connected to receive the primary and standby AC power signals;
  an output rectifier operatively connected to the isolation transformer for generating an output DC power signal based on the primary and standby AC power signals;
  a plurality of output inverters, where each of the output inverter generates an AC power signal for the load connected thereto based on the output DC power signal;
  a switch array arranged between the output inverters and the loads of the communications system, the switch array comprising a primary switch arranged between each of the output inverters and the load associated therewith, and at least one secondary switch arranged between two of the loads associated with the output inverters; and
  switch control means for controlling the switches to connect one or more of the output AC power signals to one or more loads of the communications system.

5. A UPS system as recited in claim 4, in which the input stage comprises:
  an input rectifier for generating an input DC power signal from a utility power signal;
  an input inverter that generates the primary AC power signal from the input DC power signal; and
  a battery inverter that generates the standby AC power signal from a battery.

6. A UPS system as recited in claim 5, further comprising a battery charger for charging the battery based on the input DC power signal.

7. A method of supplying AC power to a communications system comprising the steps of:
  generating primary and standby AC power signals;
  passing the primary and standby AC power signals through an isolation transformer;
  generating an output DC power signal based on the primary and standby AC power signals;
  providing a plurality of output inverters, where each of the output inverters generates an AC power signal based on the output DC power signal; arranging a switch array between the output inverters and one or more loads of the communications system, the switch array comprising a primary switch arranged between each of the output inverters and the load associated therewith, and at least one secondary switch arranged between two of the loads associated with the ouput inverters; and
  controlling the primary and secondary switches to connect one or more of the output AC power signals to one or more loads of the communications system.

8. A method as recited in claim 7, in which the step of generating the primary and standby AC power signals futher comprises the steps of:
  generating an input DC power signal from a utility power signal; generating the primary AC power signal from the input DC power signal; and generating the standby AC power signal from a battery.

9. A method as recited in claim 8, further comprising the step of charging the battery based on the input DC power signal.

10. A system operatively connected between a source of a utiity power signal and at least one load for generating an uninterruptible power signal for use in communications networks, the system comprising:
  input terminals connected to the source of the utility power signal;
  output terminals connected to the at least one load;
  a transformer comprising first, second, and third windings;
  an input DC bus;
  an output DC bus;
  a battery;
  an input rectifier operatively connected between the input terminals and the first DC bus, where the rectifier generates a first DC power signal on the first DC bus based on the utility power signal;

a battery charger operatively connected between the first DC bus and the battery for charging the battery;

a first inverter operatively connected between the first DC bus and the first windings of the transformer for generating a primary AC power signal across the second windings;

a second inverter operatively connected between the third windings of the transformer and the second DC bus based on at least one of the primary AC power signal and the standby AC power signal;

a plurality of output inverters operatively connected between the second DC bus and the output terminals, where each output inverter generates an output AC power signal that energizes the at least one load;

a swutch array operatively connected between the output inverters and the output terminals, the switch array comprising a primary switch arranged between each of the output inverters and the load associated therewith, and at least one secondary switch arranged between two of the loads associated with the output iverters; and a control circuit for controlling the switch array to connect a selected one of the plurality of output inverters to the at least one load.

11. A system as recited in claim 10, in which a load is connected to each of the plurality of output inverters.

12. A system as recited in claim 10, in which a load is connected to each of the plurality of output inverters.

13. A system as recited in claim 12, in which a load is connected to each of the plurality of output inverters.

14. A system as recited in claim 10, in which:

a load is associated with each of the plurality of output inverters; and the switch array comprises
  a secondary switch operatively connected between loads, and
  a primary switch operatively connected between each of the output inverters and the load associated therewith; wherein the control circuit operates in
  a first mode in which the secondary switch is opened and the primary switches are closed; and
  a second mode in which the secondary switch is closed and one of the primary switches is opened.

15. A system as recited in claim 10, further comprising a filter circuit operatively connected between each of the output inverters and the at least one load.

* * * * *

UNITED STATES PATENT AND TRADEMARK OFFICE
CERTIFICATE OF CORRECTION

| | | |
|---|---|---|
| PATENT NO. | : 6,288,916 B1 | |
| APPLICATION NO. | : 09/419220 | |
| DATED | : September 11, 2001 | |
| INVENTOR(S) | : Frank Liu, Pu Han and Lam Vu | |

It is certified that error appears in the above-identified patent and that said Letters Patent is hereby corrected as shown below:

In the Claims:

Column 7, Claim 1, line 24, after "stage" insert --that generates--.

Signed and Sealed this

Twentieth Day of February, 2007

JON W. DUDAS
*Director of the United States Patent and Trademark Office*